(12) United States Patent
Wang

(10) Patent No.: US 10,536,294 B2
(45) Date of Patent: Jan. 14, 2020

(54) COMPUTER-BASED PLATFORM FOR QUALITY MANAGEMENT OF HOME DEVICES

(71) Applicant: MIDEA AMERICA CORP., Parsippany, NJ (US)

(72) Inventor: Dongyan Wang, San Jose, CA (US)

(73) Assignee: MIDEA AMERICA CORP., Parsippany, NJ (US)

(\*) Notice: Subject to any disclaimer, the term of this patent is extended or adjusted under 35 U.S.C. 154(b) by 214 days.

(21) Appl. No.: 15/652,190

(22) Filed: Jul. 17, 2017

(65) Prior Publication Data

US 2019/0018883 A1 Jan. 17, 2019

(51) Int. Cl.

| | |
|---|---|
| *G06F 7/02* | (2006.01) |
| *G06F 16/00* | (2019.01) |
| *H04L 12/28* | (2006.01) |
| *G06F 17/27* | (2006.01) |
| *G06N 5/02* | (2006.01) |
| *G06F 16/957* | (2019.01) |
| *G06F 16/2457* | (2019.01) |

(Continued)

(52) U.S. Cl.
CPC ...... *H04L 12/2825* (2013.01); *G06F 16/2457* (2019.01); *G06F 16/9574* (2019.01); *G06F 17/2785* (2013.01); *G06N 5/025* (2013.01); *H04L 12/2809* (2013.01); *H04W 4/04* (2013.01); *G06F 3/048* (2013.01); *H04L 41/5038* (2013.01)

(58) Field of Classification Search
CPC ............. G06F 16/9574; G06F 16/2457; G06F 17/2785; G06F 17/2765; G06F 9/4843; G06F 3/048; H04W 4/04; H04L 12/2809; H04L 12/2825; H04L 67/12; H04L 41/5038; G06N 5/022; G06N 5/025
See application file for complete search history.

(56) References Cited

U.S. PATENT DOCUMENTS

| | | | | |
|---|---|---|---|---|
| 2007/0288223 A1\* | 12/2007 | Werkmann | ......... | G05B 19/0426 703/22 |
| 2011/0093424 A1\* | 4/2011 | Zimmermann | ........ | G05B 17/02 706/47 |

(Continued)

FOREIGN PATENT DOCUMENTS

| | | |
|---|---|---|
| CN | 101217763 A | 7/2008 |
| CN | 102819600 A | 12/2012 |
| CN | 103023028 A | 4/2013 |

OTHER PUBLICATIONS

PCT International Search Report and Written Opinion, PCT Application No. PCT/CN2018/091302, dated Aug. 30, 2018, eight pages.

*Primary Examiner* — Bruce M Moser
(74) *Attorney, Agent, or Firm* — Morgan, Lewis & Bockius LLP

(57) ABSTRACT

A quality management platform for home devices is implemented on a computer system and comprises a knowledge repository and a query engine. The knowledge repository includes a knowledge graph of nodes connected by edges. The nodes represent concepts relating to home devices and their operation and faults, and the edges represent relations between the concepts. The query engine receives requests relating to home devices, queries the knowledge graph based on the requests, and returns responses based on the query results.

18 Claims, 10 Drawing Sheets

(51) Int. Cl.
  *H04W 4/04* (2009.01)
  *H04L 12/24* (2006.01)
  *G06F 3/048* (2013.01)

(56) References Cited

U.S. PATENT DOCUMENTS

2016/0154913 A1* 6/2016 Altare ................... G06Q 10/06
                                                     703/13
2018/0278710 A1* 9/2018 Sun ..................... H04L 67/2823

* cited by examiner

Request

Why is there no display on the touch screen in the welcome interface? How to solve this fault?

Query (class expression)

(causeOf some (hasSymptom some "no display on the touch screen in the welcome interface")) OR ("air conditioner solution" AND solutionOf some (hasSymptom some "no display on the touch screen in the welcome interface"))

Execute    Add to ontology

Query Results

Subclasses (2 of 3)
- Cause for fault of touch screen of machine unit
- Solution for fault of touch screen of machine unit Instances (11 of 11)
- 1. Inspect whether emergency stop button is normal, already reset
- 2. Inspect whether air switch is on
- 3. Inspect whether power cable and communication cable of the touch screen are correctly connected and whether screw is tightened
- 4. For machine unit with insulating transformer, inspect whether transformer is connected correctly, whether components are normal
- 5. Inspect whether switch power supplier A9 is normal
- 6. Inspect whether communication cable is correctly connected and secured
- Section of weak current control, fuse is burned
- Section of weak current control, air switch is not closed
- No power supply to the display screen
- Emergency stop switch of the machine unit is not reset after it is pressed.
- Communication fault between touch screen and controller

FIG. 5A

Request

What tools can be used to test electrical current of machine unit?

Query (class expression)

tools AND measure ONLY ("electrical current" AND *parameterOf* some "machine unit")

[ Execute ]   [ Add to ontology ]

Query Results

Subclasses (1 of 2)
- current clamp

Instances (0 of 0)

FIG. 5C

5. Electrical Control Maintenance Operation Guidelines Manual for Water Cooling Threaded Shaft    53
    5.1 Electrical current test    53
    5.2 Test of electrical voltage, electrical resistance and temperature    53
    5.2 Treatment for fault of machine unit touch    54
    5.4 Compressor cannot operate normally    57
    5.5 Treatment for compressor's failure to be stopped    60
    5.6 Treatment for adjustable fault of compressor    61
    5.7 Fault of water flow    64
    5.8 Treatment for fault of electrical power supply protection    64
    5.9 Fault of temperature sensor    67
    5.10 Treatment for protection within compressor    69
    5.11 Treatment for protection of compressor oil level    71
    5.12 Treatment for fault of protection related to high voltage    73
    5.13 Treatment for fault of protection related to low voltage    75
    5.14 Treatment for compressor overload protection    75
    5.15 Treatment for fault of contactor    77
    5.16 Introduction to electronic expansion valve and Treatment of common fault    78
    5.17 Treatment for molded-case circuit breaker tripping    80
    5.18 Treatment for miniature circuit breaker tripping    81

FIG. 6

COMPUTER-BASED PLATFORM FOR QUALITY MANAGEMENT OF HOME DEVICES

BACKGROUND

1. Technical Field

This disclosure relates generally to quality management of home devices.

2. Description of Related Art

As technology progresses, more types of home devices and more capable home devices are available to end users to improve their lives and to meet various needs. Every year new home devices are created to perform new tasks, including tasks that previously were available only in restaurant or commercial settings. In addition, existing home devices are improved to provide better or more functions. This progress in home devices is also accelerating over time and is becoming more worldwide. New devices are introduced more frequently and are distributed more quickly over a wider geography of customers. This pace will only accelerate as home devices become Internet-enabled or obtain other communications capability, allowing remote upgrades and reporting from home devices in the field.

However, one disadvantage is that the distribution of information relating to these devices must also keep pace with the accelerating progress of new devices. As new home devices are introduced, end users must be provided instructions on their operation and maintenance, new procedures for troubleshooting and remediation must be developed and distributed, and service staff in the field must be provided with up-to-date information for new devices and new models of existing devices. Meanwhile, information for existing devices and existing models cannot be discarded as many of those home devices will remain in operation for many years.

Thus, there is a need for improved approaches to the overall quality management of home devices.

SUMMARY

The present disclosure overcomes the limitations of the prior art by providing a computer-based platform for quality management of home devices. The quality management platform includes a knowledge repository and a query engine. The knowledge repository includes a knowledge graph of nodes connected by edges. The nodes represent concepts relating to home devices and their operation and faults, and the edges represent relations between the concepts. The query engine receives requests relating to home devices, queries the knowledge graph based on the requests, and returns responses based on the query results.

Preferably, the knowledge repository includes information extracted from a broad base of sources: user manuals, repair manuals, service manuals, and other manuals generated by the manufacturer or others; social media, product reviews, product comparisons, product ratings, and Internet-based sources such as Wikipedia and blogs; knowledge from human domain experts; customer service records, repair and warranty records, manufacturing and testing records, and other more structured data; and error codes, user discovery data, incident reports, and other data collected by home devices in the field. The quality management platform can include modules to extract relevant knowledge from these sources and code them as nodes and edges in the knowledge graph. Information can also be stored in a content repository, with references between the knowledge graph and the content repository.

The quality management platform preferably is useful to a wide variety of users: end users of the devices, service staff (e.g., repairmen), post-sales support such as call centers, and entities in the supply chain. Supply chain entities can include the design team, manufacturer and its suppliers, the distribution channel and QC/QA teams. The user interface preferably includes a mobile interface so that users of the platform can interact with the quality management platform via their mobile phones or other mobile devices.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

FIGS. 5A-5C show example requests from users and the query results, in accordance with the invention.

FIG. 6 is an excerpt from a table of contents of an operations manual.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
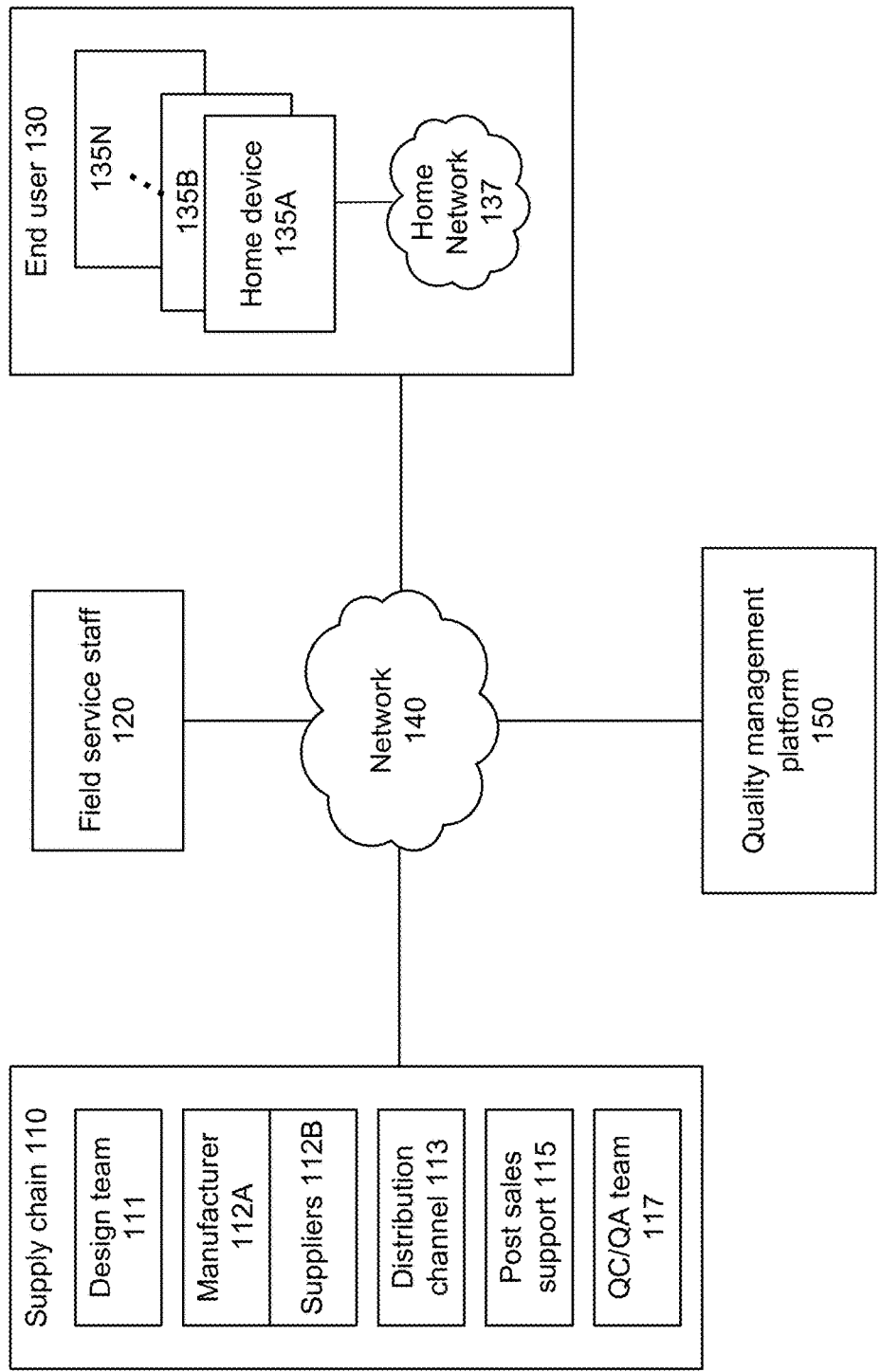
FIG. 1 is a diagram of a system including a quality management platform, in accordance with the invention.

FIG. 1 is a diagram of a system including a quality management platform 150, in accordance with the invention. The quality management platform 150 is used to manage and enhance the quality of home devices 135A-N. Examples of home devices 135 include HVAC devices (e.g., air conditioner, heater, air venting), lighting, powered window and door treatments (e.g., door locks, power blinds and shades), powered furniture or furnishings (e.g., standing desk, recliner chair), audio devices (e.g., music player), video device (e.g., television, home theater), environmental controls (e.g., air filter, air freshener), kitchen appliances (e.g., rice cooker, oven, coffee machine, refrigerator), bathroom appliances, and household robotic devices (e.g., vacuum robot, robot butler). The home devices 135 can include other types of devices that can be used in a household.

In the example of FIG. 1, the end user 130 is using home devices 135 in a residential environment, such as a house, a condo, an apartment, or a dormitory. Other end users may use home devices in a non-residential environment, including for example a work environment (e.g., an office) or a business environment (e.g., a store, a clinic). For convenience, only one end user is shown in FIG. 1.

In FIG. 1, the end user's residential environment also includes a home network 137 connecting the home devices 135. The term "network" is intended to be interpreted broadly. It can include formal networks with standard defined protocols, such as Ethernet and InfiniBand. In one embodiment, the network 137 is a local area network that has its network equipment and interconnects managed within the residential environment. The network 137 can also combine different types of connectivity. It may include a combination of local area and/or wide area networks, using both wired and/or wireless links. Data exchanged between the components on the network may be represented using any suitable format. In some embodiments, all or some of the data and communications may be encrypted. The home network 137 may simply be a communications network, including connection to external networks 140 and external devices, such as cloud-based services and the quality management platform 150. In some embodiments, the home network 137 may also include intelligence, such as a hub that controls or configures the home devices 135.

The system of FIG. 1 also includes a supply chain 110 and field service staff 120 for the home devices. The term "supply chain" is intended to be interpreted broadly. It generally includes entities that are involved in producing, delivering and/or servicing the home devices 135. Some examples include the design team 111 that designs and improves the home devices 135, the manufacturer 112A of the home devices and the suppliers 112B of components and services used in the manufacturing, the distribution channel 113 which may include distributors and retail shops, post-sales support 115 such as a call center, and quality control (QC)/quality assurance (QA) team 117. Various entities may play more than one role. For example, a large home appliance manufacturer may perform design 111, manufacturing 112A, some support 115 and QC/QA 117. Also, the entities playing these roles may be different for different home devices.

The field service staff 120 is responsible for providing service to home devices in the field. They may be independent repairmen or the local service office for the device manufacturer.

Network 140 may also be implemented in different ways. If the network 140 includes the Internet, then it also provides access to Internet resources, such as product reviews, blogs, and social media.

The quality management platform 150 is implemented on a computer system. It collects, organizes and provides information relating to the quality and operation of the home devices. It typically provides fault identification and remediation, and operation and maintenance instructions. It may also collect information and statistics on these subjects as feedback to the supply chain.

Figure 2:
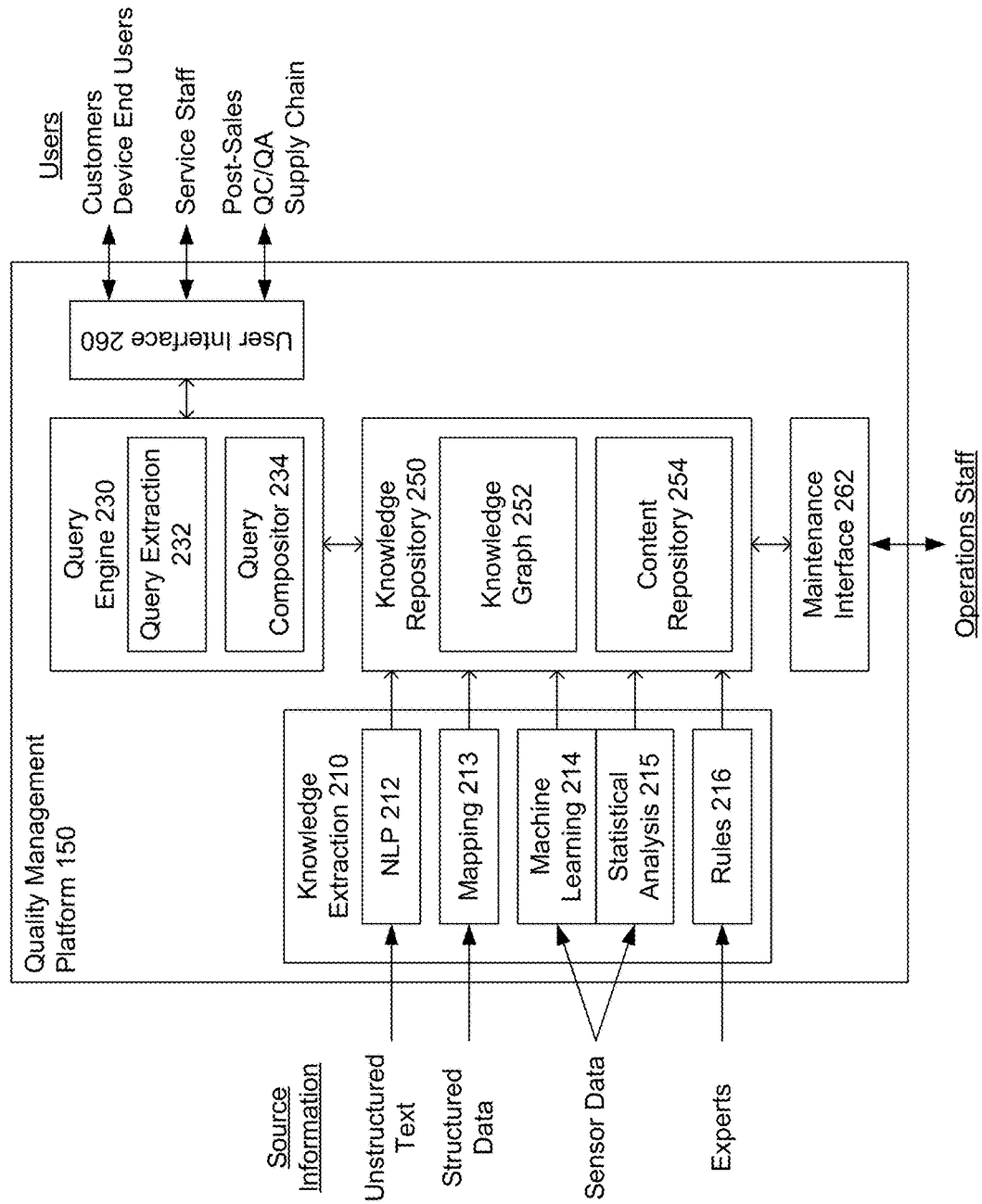
FIG. 2 is a block diagram of an example implementation of a quality management platform, in accordance with the invention.

FIG. 2 is a block diagram of an example implementation of a quality management platform 150. The platform 150 includes a knowledge repository 250 and a query engine 230. The knowledge repository 250 stores the information about the home devices 135. The query engine 230 receives requests relating to the home devices, queries the knowledge repository 250, and returns responses based on the query results.

In the example of FIG. 2, the knowledge repository 250 includes a knowledge graph 252 and a content repository 254. The knowledge graph 252 is a graph of nodes connected by edges. The nodes represent concepts relating to the home devices and their operation and faults (i.e., errors). The edges represent relations between the concepts. In this example, the query engine 230 includes a query extraction module 232 and a query compositor 234. The compositor 234 composes queries in the correct syntax for the knowledge graph 252. The extraction module 232 bridges the gap between the user's requests and the query compositor 234. For example, the user's request may be a natural language question. Module 232 extracts the relevant information from the natural language question, and compositor 234 assembles this information into a correct syntax for querying the knowledge graph 252. The query results are used to identify information from the content repository 254 to be returned to the user. For example, certain nodes in the knowledge graph 252 may point to corresponding content in the content repository 254. Further details and examples are given below.

The platform 150 optionally also includes a knowledge extraction module 210. This module 210 extracts knowledge from different source information and adds the extracted knowledge to the knowledge repository. For example, based on the source information, it may add or modify nodes and edges to the knowledge graph 252 and also add or modify information stored in the content repository 254. The knowledge extraction module 210 extracts information from a variety of different sources, including unstructured text, structured data, and sensor data and other information collected from home devices in the field.

The platform 150 also includes interfaces to users of the platform and to staff operating and maintaining the platform. In FIG. 2, these are shown as a separate user interface 260 and maintenance interface 262, but they are not required to be separate. The users generally could be any of the entities shown in FIG. 1: end users (customers), service staff, design team, manufacturer, post-sales support, QC/QA, etc. The user interface 260 preferably includes a mobile interface, so that users can send requests and receive responses via their mobile phone or other mobile device. The maintenance interface 242 allows staff to maintain the quality management platform 150, including the knowledge repository. For example, staff might review, test, edit and otherwise manage the information stored in the knowledge graph 252 and content repository 254. They may also implement and oversee knowledge extraction 210 from various sources.

Before describing further details of the platform 150, it is useful to consider some use cases for the platform 150. As mentioned previously, the approach described herein can be used to support use cases for any of the entities shown in FIG. 1 (although support of all of these entities is not required). For example, end users of the home devices might make requests regarding the operation of the home devices or simple faults. The platform 150 might return descriptions of the device operation, typical or recommended operating parameters, correction of faults that can be performed by the end user, device self-fixes and/or recommended maintenance schedules.

Service staff in the field typically will make requests regarding faults or symptoms. The platform might return procedures to diagnosis the fault, identification of the fault based on symptoms or a ranking of possible faults, remediation instructions for correcting the fault, safety instructions for working with the device, and procedure for restarting the device after fault correction. The platform may also return supporting information, such as a list of replacements parts, tools used to fix the device, and a description of the operating principles. In another scenario, the platform might return information related to installation and initial setup/configuration of the home devices, if the service staff (or end user) is performing installation services. Similar support can also be provided to other types of post-sales support, for example a call center that provides remote support for the home devices.

If the platform receives information from home devices in the field, then it can be queried to provide feedback to the supply chain, including QC/QA teams and other types of post-sales analysis. Many home devices will self-report various events and sensor data, such as faults or values of certain parameters during operation. Examples of information that would be useful to analyze, either statistically or otherwise, include service recommendations, service cost, quality, occurrence of defects, occurrence of faults, root causes, customer feedback, and any correlations or other patterns. Information collected over time can be used to improve the design, manufacture and servicing of the home devices. Reports can be generated for the supply chain and for other users.

Figure 3:
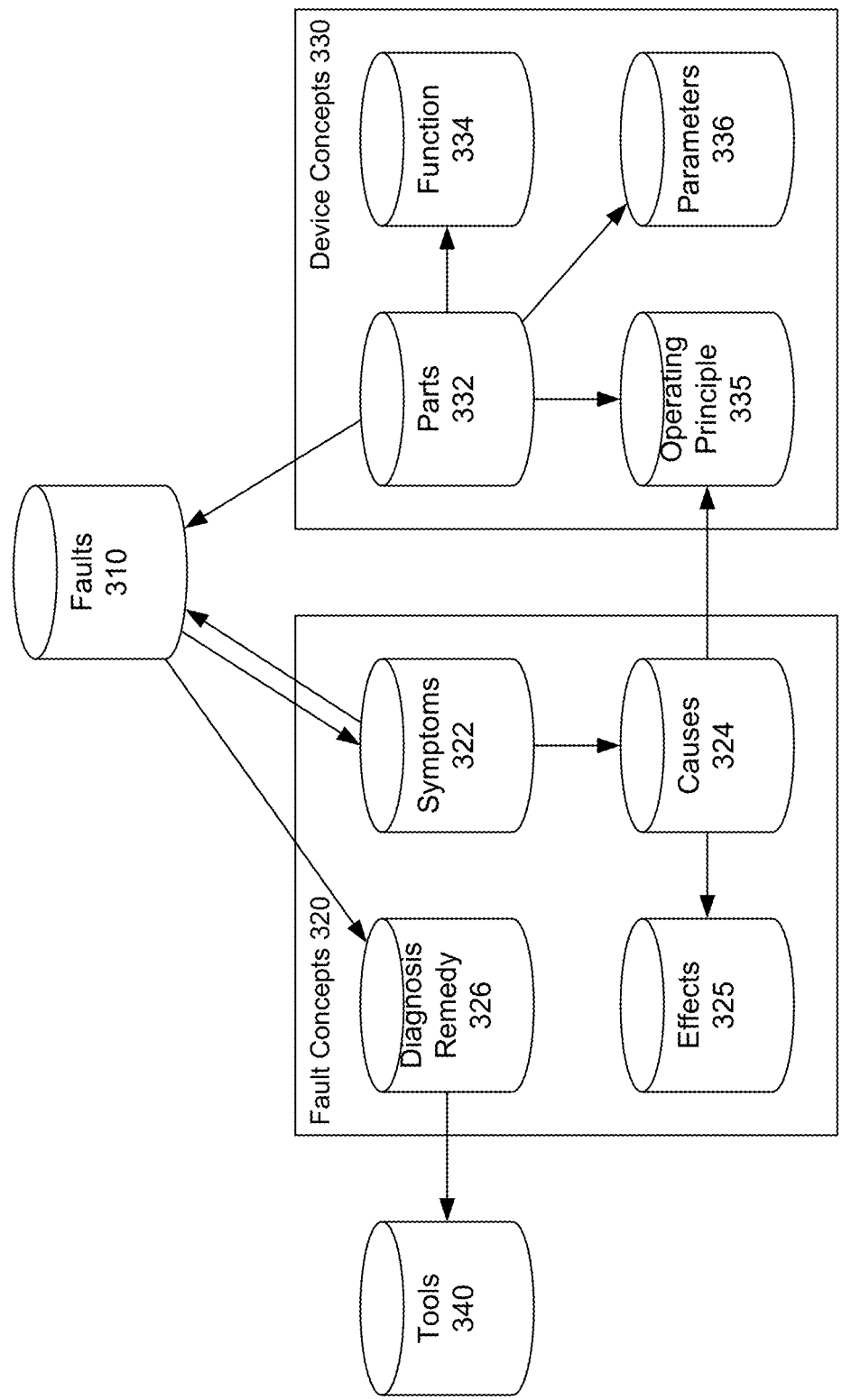
FIG. 3 illustrates some of the concepts that preferably are captured in a knowledge repository, in accordance with the invention.

In order to return meaningful results to users, the knowledge repository 250 captures sufficient information and represents it in a manner that it can be meaningfully queried by users. FIG. 3 is a diagram that conceptually illustrates some of the concepts that preferably are captured in the knowledge repository 250. This example is focused on faults 310. In addition to the faults 310 themselves, the knowledge repository 250 may also capture related concepts, which in this example is divided into fault-related concepts 320 and device-related concepts 330. Examples of fault-related concepts 320 include what are the symptoms 322 of the fault, and what causes 324 the symptoms or the fault and what are other resulting effects 325. Diagnosis and remediation 326 of the fault preferably are also captured, including what tools 340 may be needed for diagnosis or remediation. Device-related concepts 330 may include which parts 332 are affected, and what is their function 334, operating principle 335 and normal operating parameters 336. The arrows show associations. For example, the arrows from 332 to 334, 335, 336 indicate that parts 332 are associated with corresponding function 334, operating principles 335 and parameters 336.

In the example platform of FIG. 2, these concepts are captured in the nodes (concepts) and edges (relations) of the knowledge graph 252. Below is a partial hierarchical listing of concepts taken from an implementation of a quality management platform:

Faults
  Faults of refrigerator
  Faults of electrical fan
  Faults of air conditioner
    Low voltage related fault
    Fault of compressor
    Fault of molded-case circuit breaker tripping
    Fault of miniature circuit breaker
    Fault of contactor
    Machine unit touch fault
    Fault of water flow
    Fault of temperature sensor
    Voltage fault
    Fault of electronic expansion valve
    Fault of electrical current
    Fault of electrical current projection
Causes of faults
  Causes of fault of refrigerator
  Causes of fault of electrical fan
  Causes of fault of air conditioner
    Cause of low voltage related fault
    Cause of fault of compressor
    Cause of fault of molded-case circuit breaker tripping
    Cause of fault of miniature circuit breaker
    Cause of fault of contactor
    Cause of machine unit touch fault
    Cause of fault of water flow
    Cause of fault of temperature sensor
    Cause of voltage fault
    Cause of fault of electronic expansion valve
    Cause of fault of electrical current protection
    Cause of fault of electrical current
    Cause of high voltage related fault
Function
  Cut off electrical power supply for machine unit
  Short protection
  Overload projection
Operating principles
Operation
  Wiring
Tools
  Multimeter
  Thermometer
  Current clamp Note that this listing is provided solely to illustrate what concepts might be included in the nodes of the knowledge graph. It is not a complete listing, and even the part shown is not complete. For example, many of the "Faults of air conditioner" are shown, but the "Faults of refrigerator" and "Faults of electrical fan" are now shown (i.e., those categories have not been expanded in the listing), to save space. Even for air conditioner, not every fault is shown and there can also be further hierarchy. For example, there can be multiple types of "Fault of compressor," which are not shown above. Many of the later headings are shown with abbreviated or no listings, for the purpose of illustration. For example, there will be many concepts under "Operating principle" and many more concepts than shown under "Function" "Operation" and "Tools". Even the listing of main concepts is not complete. For example, "Symptoms" "Diagnosis" and "Remediation" typically would also be included, as could be any of the other concepts shown in FIG. 3. This example is organized hierarchically and some of the edges in the knowledge graph will capture the hierarchical relationship. However, concepts are not required to be organized in this manner.

Below is a partial listing of relations taken from an implementation of a quality management platform:

causeOf
  componentOf
  conditionOf
  detailOf
  faultOf
  functionOf
  methodOf
  parameterOf
  principleOf
  resultOf
  solutionOf symptomOf
hasCause
hasComponent
hasCondition
hasDetail
hasFault
hasFunction
hasMethod
hasParameter
hasPrinciple
hasResult
hasSolution
hasSymptom
inCondition
measure
measuredBy
next
referTo
resultIn
series
useMethod This is also just an excerpt provided to illustrate what relations might be represented by the edges of the knowledge graph. It is not a complete listing, and even the part shown is not complete. For convenience, the relations can be grouped into three categories and are listed in this order in the above excerpt: xxxOf, hasXxx, and other. xxxOf and hasXxx are counterparts. If Node A hasCause Node B, then Node B is causeOf Node A. In this implementation of the knowledge graph, both directions are labelled. In an alternate approach, only one direction is labelled and the other relation can be inferred. If Node A hasCause Node B, then it can be inferred that Node B is a cause of Node A.

Figure 4A:
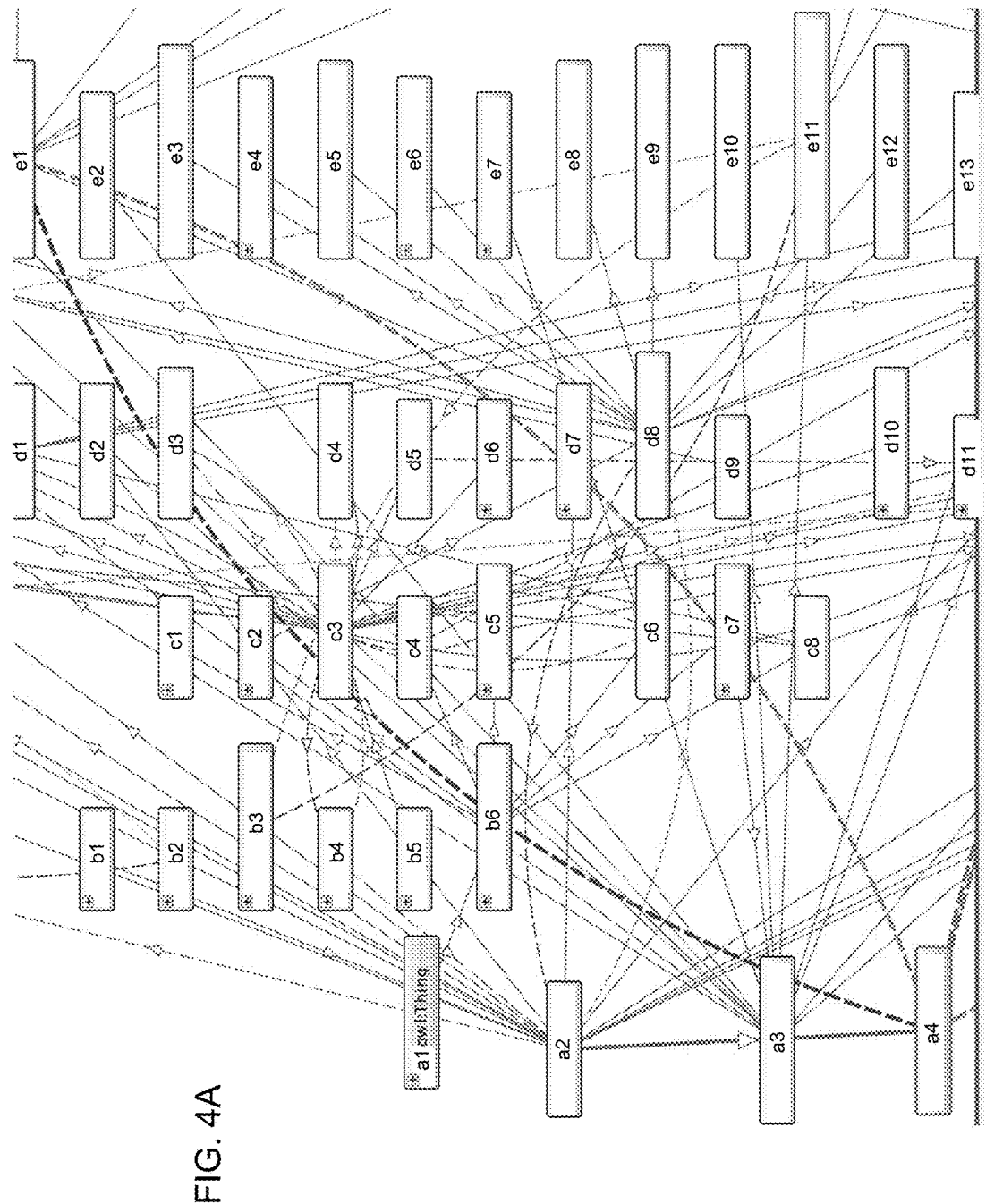
FIGS. 4A-4C show example excerpts from a knowledge graph, in accordance with the invention.
Figure 4B:
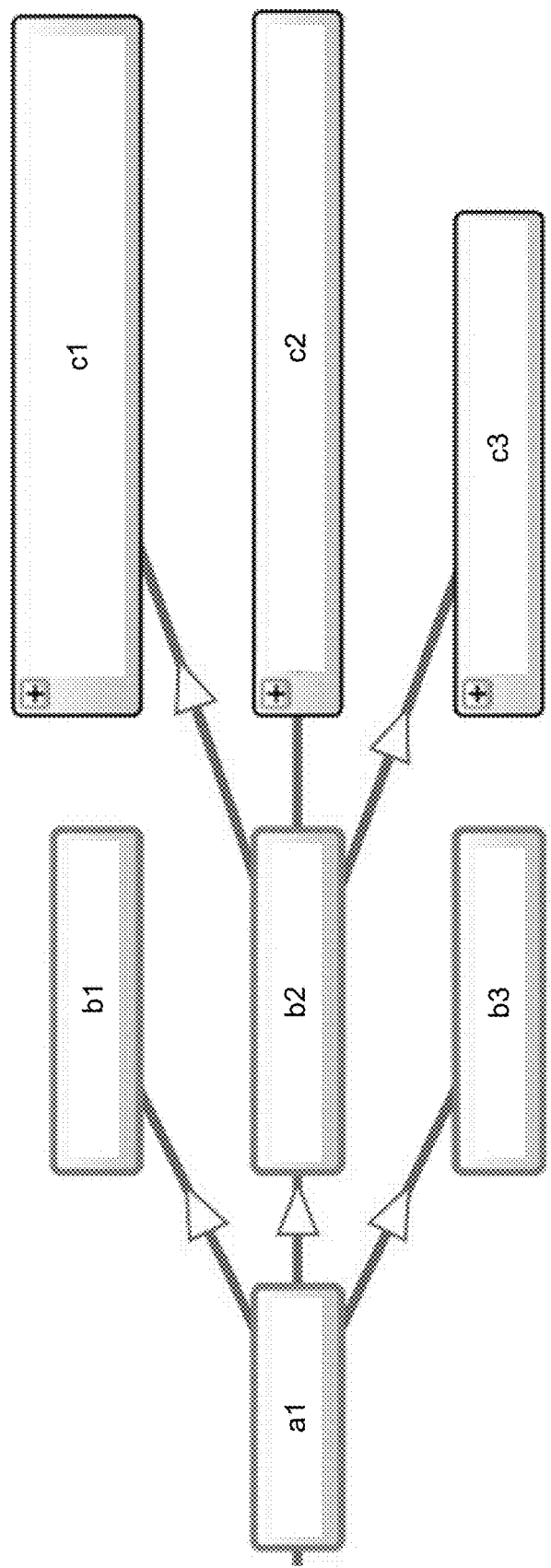
Figure 4C:
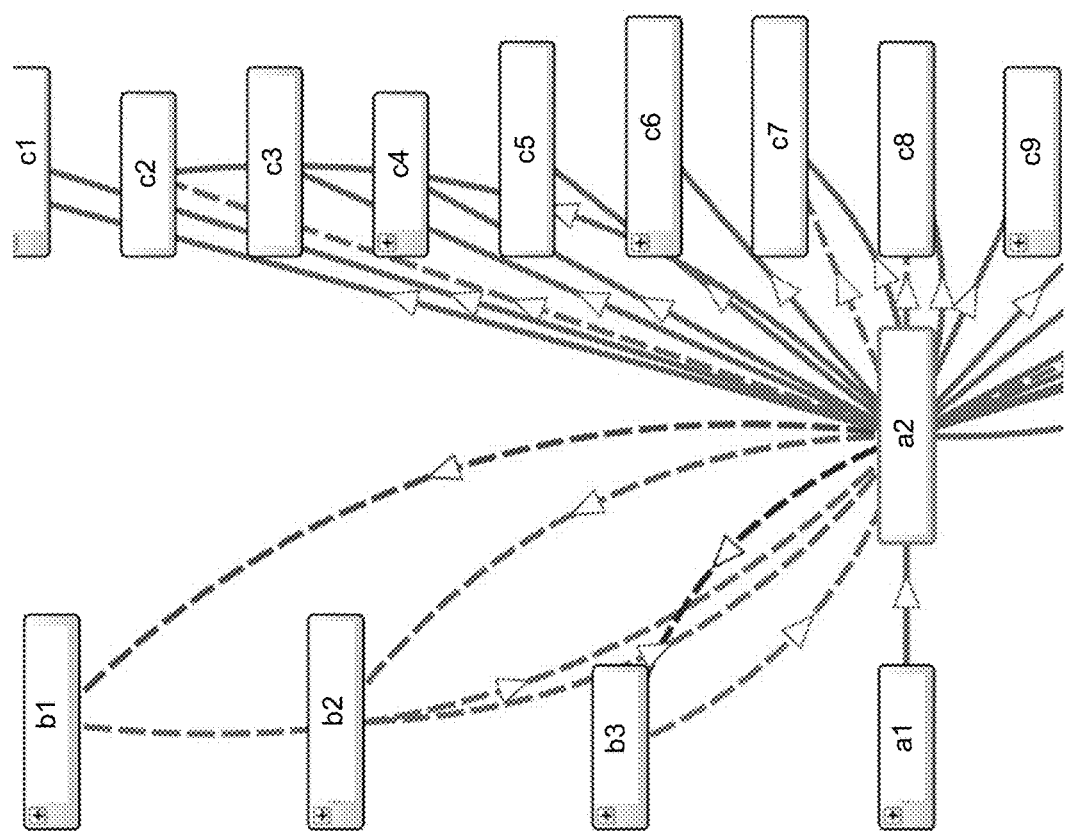

FIGS. 4A-4C show example excerpts from a knowledge graph. In these examples, the nodes are represented by boxes and the edges are represented by arrows. FIG. 4A shows a larger section of the knowledge graph. The node labels are in Chinese, with labels and translations given below:

Column 1
 a2. Fault of air conditioner
 a3. Solution for air conditioner
 a4. Touch fault of machine unit
Column 2
 b1. Fault
 b2. Voltage
 b3. Machine unit has no power and stops
 b4. Air conditioner
 b5. Parts
 b6. Concepts in the field of electrical devices
Column 3
 c1. Function
 c2. Cause
 c3. Parts of air conditioner
 c4. Operation
 c5. Physical parameter
 c6. Operating principle
 c7. Solution
 c8. Symptom
Column 4
 d1. Symptom of air conditioner
 d2. Fault of water flow
 d3. Iron core of contactor
 d4. Mechanical structure
 d5. Component
 d6. Compressor
 d7. Voltage fault
 d8. Cause for air conditioner fault
 d9. Wiring
 d10. Time relay
 d11. Machine unit
Column 5
 e1. Cause for touch fault of machine unit
 e2. Plan for fault of water flow
 e3. Cause for fault of miniature circuit breaker
 e4. Cause for fault of contactor
 e5. Cause for low voltage related fault
 e6. Cause for fault of compressor
 e7. Plan for fault of electrical resistor
 e8. Cause for fault of electrical current protection
 e9. Cause for fault of temperature sensor
 e10. Plan for miniature circuit breaker tripping
 e11. Solution for molded-case circuit breaker tripping
 e12. Cause for fault of electronic failure valve
 e13. Cause for fault of electrical current FIGS. 4B and 4C show more detailed sections of the knowledge graph. FIG. 4B shows hierarchical navigation from Node "a1: Symptom". The next layer down in the hierarchy includes the nodes:
 b1. Symptom of electrical fan
 b2. Symptom of air conditioner
 b3. Symptom of refrigerator For the next layer down, Node "b2: Symptom of air conditioner" can be partially expanded as
 c1. Any normal open contacts KM11 or KM 12 is not closed
 c2. Touch screen has no display in welcome interface
 c3. Machine unit has some fault In this example, the relations are all hierarchical subsets. Node "a1: Symptom" has the subsets b1-b3. Node "b2: Symptom of air conditioner" has the subsets c1-c3, and so on.

FIG. 4C shows navigation from Node "a1: Parts". A subset of Node "a1: Parts" is Node "a2: Parts of air conditioner." This example shows relations beyond just the parent-child hierarchical relation. The left column includes the following nodes, with the following relations:

| | |
|---|---|
| b1. Physical parameters. | Node a2 hasParameter Node b1. |
| b2. Operating principle. | Node a2 hasPrinciple Node b2. |
| b3. Air conditioner. | Node a2 componentOf Node b3. |

Figure 5B:
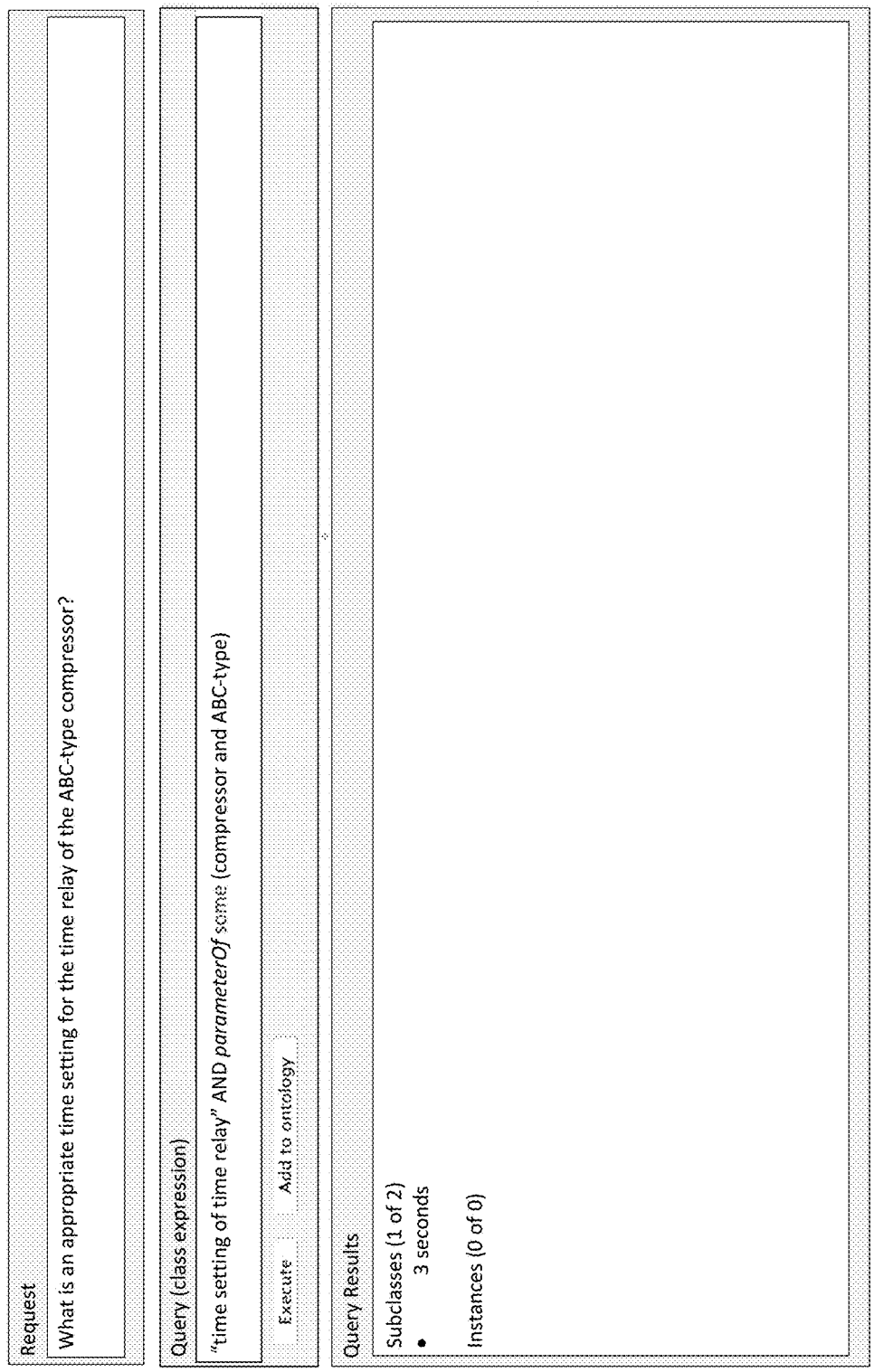

Nodes cx in the right column list different parts:
 c1. Master switch
 c2. Coil
 c3. Contactor
 c4. Power supply
 c5. Thermal relay
 c6. Temperature sensor
 c7. Iron core of contactor
 c8. Mechanical structure
 c9. Components FIGS. 5A-5C show example requests and the corresponding query results. Each of these figures show the natural language request from the user, the resulting query for the knowledge repository, and the query results from the knowledge repository. In FIG. 5A, the user is a repairman and makes a request "Why is there no display on the touch screen in the welcome interface? How to solve this fault?" The query extraction module 232 extracts the relevant information and the query compositor 234 creates the query shown in FIG. 5A, where "some" is the class being sought. The "Execute" button causes execution of the query.

Querying the knowledge graph 252 returns the two subclasses and eleven instances shown. The first six instances, numbered 1-6, are instances of diagnosis steps. The remaining five instances are possible causes. More information can be retrieved by clicking each instance.

One potential advantage of the quality management platform 150 is that it can be used by many different users for many different purposes: repair staff, customer service, end users, QC/QA and even other machines such as an artificial intelligence (AI) home assistant. Another possible advantage is that the quality management platform 150 can acquire knowledge from many different information sources, and that knowledge can be accumulated over time.

Referring again to FIG. 2, sources of information can include unstructured text, structured data, and sensor data and other information collected from home devices in the field. Examples include user manuals, repair manuals, service manuals, and other manuals generated by the manufacturer or others. Other examples of unstructured content include social media, product reviews, product comparison, product ratings, and Internet-based sources such as Wikipedia and blogs. Unstructured text can be processed, for example using natural language processing 212, and then incorporated into the quality management platform.

FIG. 6 is a table of contents for Chapter 5 from an operations manual for an air conditioner. Chapter 5 is "Electrical Control Maintenance Operation Guidelines Manual for Water Cooling Threaded Shaft". This chapter concerns faults of the compressor. In one approach, the table of contents and the manual are processed using deep natural language parsing, semantic analysis and entity-relation extraction techniques. This yields concepts and relations that are coded in the knowledge graph 252. Relevant text and pictures can also be stored in the content repository 254. For example, Section 5.8 is "Treatment for fault of electrical power supply protection." This concept can be incorporated into the knowledge graph 252, with the actual text and figures stored in the content repository 254. The representation in the knowledge graph can be used to respond to user queries, and the actual text and figures can then be provided to users making relevant queries.

Returning to FIG. 2, knowledge from domain experts may also be incorporated into the quality management platform. Experienced repairmen may notice certain patterns or develop better remediation approaches, which may be captured in the quality management platform. In one approach, knowledge from domain expert is expressed as rules 216, which are then encoded as concepts and relations in the knowledge graph.

Other sources of information can include customer service records, repair and warranty records, manufacturing and testing records, and other more structured data. In some cases, structured data can be incorporated into the quality management platform more directly because it is already structured. Fields may be mapped 213 to nodes and edges of the knowledge graph. In other cases, the data may be analyzed using machine learning 214 or statistical analysis 215 to determine relevant concepts and relations (e.g., symptoms and causality of faults). Sensor data generated in the field may also be analyzed to determine relevant concepts and relations. For example, sensors in home devices in the field may collect data, both during normal operation and for faults. This data can include error codes, user discovery data and incident reports. Based on user activity records, user profile or usage patterns might be extracted. This data can then be analyzed 214, 215 to improve the quality management platform. In some cases, data is automatically reported by the home devices via the Internet or other networks.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules, even if drawn as separate elements in the figures.

What is claimed is:

1. A computer system implementing a platform for quality management of home devices, comprising:
   one or more processors; and
   memory storing instructions that interact with a knowledge repository comprising a knowledge graph and content repository, wherein the knowledge graph includes nodes connected by edges, the nodes representing concepts relating to home devices and their operation and faults, and the edges representing relations between the concepts, wherein a first node corresponding to a concept of device faults in the knowledge graph is linked to a second node corresponding to a concept of fault symptoms, a third node corresponding to a concept of fault diagnosis and remediation, and a fourth node corresponding to a concept of affected device parts, wherein the third node corresponding to the concept of fault diagnosis and remediation is linked to a fifth node corresponding to a concept of tools needed for diagnosis or remediation, and wherein at least some of the nodes in the knowledge graph point to corresponding information in the content repository; and wherein the instructions, when executed by the one or more processors, cause the processors to perform operations comprising:

composing a structured query for the knowledge graph based on a user's natural language request regarding a first device;

traversing the knowledge graph based on the structured query to identify a plurality of query results that represent at least one subclass of the fifth node corresponding to the concept of tools needed for diagnosis or remediation;

identifying information from the content repository in accordance with the plurality of query results, including identifying a listing of tools required to fix the first device; and presenting the listing of tools required to fix the first device in a device maintenance user interface.

2. The computer system of claim 1 wherein the second node corresponding to the concept of fault symptoms is linked to a sixth node corresponding to a concept of causes of faults of home devices, wherein the plurality of query results identified by traversing the knowledge graph includes at least one subclass of the sixth node corresponding to the concept of causes of faults of home devices, and wherein identifying the information from the content repository in accordance with the plurality of query results includes identifying a plurality of possible causes for faults of the first device.

3. The computer system of claim 1 wherein the fourth node corresponding to the concept of affected device parts is linked to a respective node representing operating principles of the affected device parts.

4. The computer system of claim 1 wherein the fourth node corresponding to the concept of affected device parts is linked to a respective node representing operating parameters of the affected device parts.

5. The computer system of claim 1 wherein some edges between pairs of nodes represent at least one of a relation that one of the nodes has a characteristic of the other node, a relation that one of the nodes is a subset of the other node, a relation of cause and effect, a relation of effect and remediation.

6. The computer system of claim 1 wherein identifying the information from the content repository in accordance with the plurality of query results includes identifying replacement parts to bring to fix the first device.

7. A non-transitory computer-readable storage medium for implementing a platform for quality management of home devices, wherein the computer-readable storage medium stores instructions for interacting with a knowledge repository comprising a knowledge graph and content repository;

wherein the knowledge graph includes nodes connected by edges, the nodes representing concepts relating to home devices and their operation and faults, and the edges representing relations between the concepts, wherein a first node corresponding to a concept of device faults in the knowledge graph is linked to a second node corresponding to a concept of fault symptoms, a third node corresponding to a concept of fault diagnosis and remediation, and a fourth node corresponding to a concept of affected device parts, wherein the third node corresponding to the concept of fault diagnosis and remediation is linked to a fifth node corresponding to a concept of tools needed for diagnosis or remediation, and wherein at least some of the nodes in the knowledge graph point to corresponding information in the content repository; and wherein the instructions, when executed by the one or more processors, cause the processors to perform operations comprising:

composing a structured query for the knowledge graph based on a user's natural language request regarding a first device;

traversing the knowledge graph based on the structured query to identify a plurality of query results that represent at least one subclass of the fifth node corresponding to the concept of tools needed for diagnosis or remediation;

identifying information from the content repository in accordance with the plurality of query results, including identifying a listing of tools required to fix the first device; and presenting the listing of tools required to fix the first device in a device maintenance user interface.

8. The computer-readable storage medium of claim 7 wherein the second node corresponding to the concept of fault symptoms is linked to a sixth node corresponding to a concept of causes of faults of home devices, wherein the plurality of query results identified by traversing the knowledge graph includes at least one subclass of the sixth node corresponding to the concept of causes of faults of home devices, and wherein identifying the information from the content repository in accordance with the plurality of query results includes identifying a plurality of possible causes for faults of the first device.

9. The computer-readable storage medium of claim 7 wherein the fourth node corresponding to the concept of affected device parts is linked to a respective node representing operating principles of the affected device parts.

10. The computer-readable storage medium of claim 7 wherein the fourth node corresponding to the concept of affected device parts is linked to a respective node representing operating parameters of the affected device parts.

11. The computer-readable storage medium of claim 7 wherein some edges between pairs of nodes represent at least one of a relation that one of the nodes has a characteristic of the other node, a relation that one of the nodes is a subset of the other node, a relation of cause and effect, a relation of effect and remediation.

12. The computer-readable storage medium of claim 7 wherein identifying the information from the content repository in accordance with the plurality of query results includes identifying replacement parts to bring to fix the first device.

13. A method for implementing a platform for quality management of home devices,
at a computer system including processors and memory storing instructions for interacting with a knowledge repository comprising a knowledge graph and content repository, wherein the knowledge graph includes nodes connected by edges, the nodes representing concepts relating to home devices and their operation and faults, and the edges representing relations between the concepts, wherein a first node corresponding to a concept of device faults in the knowledge graph is linked to a second node corresponding to a concept of fault symptoms, a third node corresponding to a concept of fault diagnosis and remediation, and a fourth node corresponding to a concept of affected device parts, wherein the third node corresponding to the concept of fault diagnosis and remediation is linked to a fifth node corresponding to a concept of tools needed for diagnosis or remediation, and wherein at least some of the nodes in the knowledge graph point to corresponding information in the content repository:
composing a structured query for the knowledge graph based on a user's natural language request regarding a first device;
traversing the knowledge graph based on the structured query to identify a plurality of query results that represent at least one subclass of the fifth node corresponding to the concept of tools needed for diagnosis or remediation;
identifying information from the content repository in accordance with the plurality of query results, including identifying a listing of tools required to fix the first device; and
presenting the listing of tools required to fix the first device in a device maintenance user interface.

14. The method of claim 13 wherein the second node corresponding to the concept of fault symptoms is linked to a sixth node corresponding to a concept of causes of faults of home devices, wherein the plurality of query results identified by traversing the knowledge graph includes at least one subclass of the sixth node corresponding to the concept of causes of faults of home devices, and wherein identifying the information from the content repository in accordance with the plurality of query results includes identifying a plurality of possible causes for faults of the first device.

15. The method of claim 13 wherein the fourth node corresponding to the concept of affected device parts is linked to a respective node representing operating principles of the affected device parts.

16. The method of claim 13 wherein the fourth node corresponding to the concept of affected device parts is linked to a respective node representing operating parameters of the affected device parts.

17. The method of claim 13 wherein some edges between pairs of nodes represent at least one of a relation that one of the nodes has a characteristic of the other node, a relation that one of the nodes is a subset of the other node, a relation of cause and effect, a relation of effect and remediation.

18. The method of claim 13 wherein identifying the information from the content repository in accordance with the plurality of query results includes identifying replacement parts to bring to fix the first device.

* * * * *